United States Patent [19]

Faltens et al.

[11] 3,733,546

[45] May 15, 1973

[54] BEAM CURRENT POSITION, INTENSITY AND PROFILE MONITORING BY RESISTIVE DETECTION OF BEAM IMAGE WALL CURRENTS

[75] Inventors: Andris Faltens, Berkeley; Edward C. Hartwig, Walnut Creek, both of Calif.; Robert T. Avery, Orinda, Calif.

[73] Assignee: The United States of America as represented by the United States Atomic Energy Commission, Washington, D.C.

[22] Filed: July 21, 1971

[21] Appl. No.: 164,761

[52] U.S. Cl. ............................324/71 R, 250/49.5 R
[51] Int. Cl. ...............................................G01n 27/00
[58] Field of Search ......................324/71 R, 71 EB, 324/72, 95; 250/49.5 R, 49.5 TE; 315/31

[56] References Cited

UNITED STATES PATENTS 3,152,238  10/1964  Anderson ........................250/49.5 R
2,640,948   6/1963  Burrill ............................250/49.5 TE

*Primary Examiner*—Michael J. Lynch
*Attorney*—Roland A. Anderson

[57] ABSTRACT

A monitor for detecting the position, intensity and profile of a pulsed charged-particle beam moving through a beam pipe, including a pair of electrically conductive flanges inserted in the pipe, separated by an insulating ring and interconnected either with numerous resistors that are uniformly distributed around and connected in parallel between the periphery of the flanges or with a solid band of uniform resistive material or a thin resistive film. The pulsed beam induces image wall currents in the beam pipe which have nearly the same waveform and magnitude as the beam current but are distributed around the pipe wall according to the position of the beam. The voltages developed across the resistors are measured across the flanges at four symmetrical points. The position of the beam is a function of the differences of the voltages at opposing points, while the intensity of the beam is a function of the sum of the voltages at the four points. The profile of a beam of asymmetric cross section is indicated by the levels of the individual voltages at the four points and, for greater accuracy, at additional points.

10 Claims, 7 Drawing Figures

INVENTOR.
ANDRIS FALTENS
BY EDWARD C. HARTWIG
ROBERT T. AVERY

Attorney

BEAM CURRENT POSITION, INTENSITY AND PROFILE MONITORING BY RESISTIVE DETECTION OF BEAM IMAGE WALL CURRENTS

BACKGROUND OF THE INVENTION

The invention disclosed herein was made under, or in, the course of Contract No. W-7405-ENG-48 with the United States Atomic Energy Commission.

The present invention relates to a system for monitoring the position, intensity and profile of charged-particle beams, and more particularly, it relates to monitoring of a charged-particle beam having single or successive wave fronts by detection of the image wall currents induced by the beam in the pipe within which the beam is moving.

Various types of monitors are known in the art for detecting the position intensity and profile of a charge-particle beam with respect to a beam pipe through which the beam is moved. These types include beam intercepting monitors having sensors mounted in or scanned through the beam path, and nonintercepting capacitive monitors and nonintercepting inductive monitors with sensors mounted within the beam pipe but clear of the beam path. The intercepting types of monitors tend to disperse the beam and possibly to be destroyed by the beam. Available nonintercepting monitors can detect beam position and intensity but not profile. Moveover, nonintercepting capacitive monitors have capacitive plates mounted within the beam pipe and tend to be noisy because of beam charge deposited on the plates while nonintercepting inductive monitors tend to be insensitive because of their inherently large self-inductance. Both the capacitive and inductive monitors have structure mounted within the beam pipe, or alternatively, in the case of some inductive monitors, loops are mounted in cavities adjacent to the pipe and require a wave conducting passage between the pipe and the cavity. Thus with either the capacitive or inductive monitors, there is a deviation from a smooth geometry within the beam pipe that is introduced by the structures being mounted within or adjacent to the pipe. These structures constitute impedance discontinuities and often cause beam instabilities, such as negative mass instability, that tend to distort the transverse shape of the beam, to modulate the beam, and generally to destroy the beam.

SUMMARY OF THE INVENTION

In brief, the present invention pertains to a monitoring system for detecting the position, intensity and profile of a charged-particle beam having single or successive wave fronts and includes means for forming the beam of charged particles for transmission through a beam pipe, during which transmission the beam induces corresponding currents in the walls of the pipe, the pipe being comprised of first and second electrically conductive sections having adjacent ends separated across a gap. Resistive means are uniformly spaced around the periphery of the pipe across the gap to electrically connect the first and second sections with respect to the wall currents; and means are connected across the resistive means for sensing the voltage drop of the wall currents across the resistive means, the drop across the resistive means at any location around the periphery of the pipe being a function of the distance of the beam from the location at which the drop is measured. The resistive means may for example be either a plurality of resistors connected in parallel across the gap and uniformly spaced therearound, a solid annular band of uniformly resistive material mounted across the gap, or a thin resistive film extending across the gap. To precisely determine the position of the beam within the pipe, the sensing means may be four connections across the resistive means, the connections being spaced 90 degrees apart around the periphery of the pipe. The sensing means further includes means for subtracting the voltage drops sensed at diametrically opposed sensing connections, the resulting two difference voltages being substantially proportional to the displacement of the beam from the central axis of the beam pipe along coordinate axes defined by the diametrically opposed sensing connections. To precisely determine the intensity of the beam, the voltage drops at the sensing connections may be added, the sum of the drops being substantially proportional to the intensity of the beam. The profile of a beam of asymmetric cross section may be determined by feeding the voltages sensed at the connections to sample and hold circuits for display on an oscilloscope. Greater accuracy of detection of an asymmetric profile may be obtained by providing additional connections across the gap.

It is an object of the invention to measure the position, intensity and profile of a charged particle beam without affecting the beam.

Another object is to provide a beam monitor that does not disrupt the smooth geometry of the pipe through which the beam is moved.

Another object is to minimize impedance discontinuities and noise of a beam monitor.

Another object is to minimize impedance discontinuities and noise of a beam monitor.

Another object is to provide a compact, broadband, sensitive, nonintercepting beam monitor.

Other objects and advantageous features of the invention will be apparent in a description of a specific embodiment thereof, given by way of example only, to enable one skilled in the art to readily practice the invention which is described hereinafter with reference to the accompanying drawings.

DESCRIPTION OF AN EMBODIMENT

Figure 1:
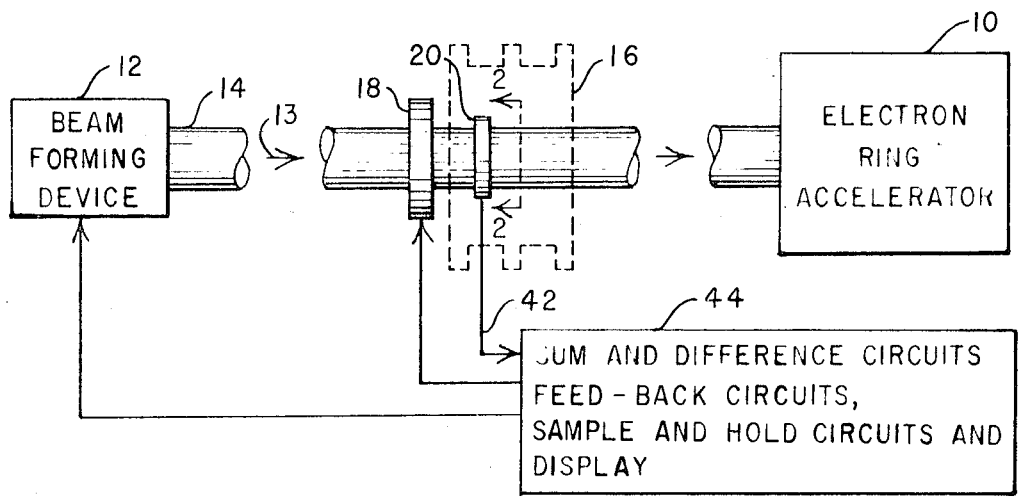
FIG. 1 is a block diagram of a beam monitor and system according to the invention.

Referring to the drawing there is shown in FIG. 1 a block diagram of an electron beam injection system for an electron ring accelerator 10. The system includes a beam forming device 12 for injecting a pulsed electron beam into a beam pipe 14 in which a vacuum is maintained. The beam is then accelerated by a series of accelerating cavities 16 (one illustrated) toward the electron ring accelerator 10 for injection therein. A series of solenoids and steering elements 18 (one illustrated) are provided for maintaining the beam on a path along the central axis of the beam pipe. A beam monitor 20 according to the invention is mounted in the beam pipe 14 for detecting the position, intensity and profile of the beam within the pipe.

Figure 2:
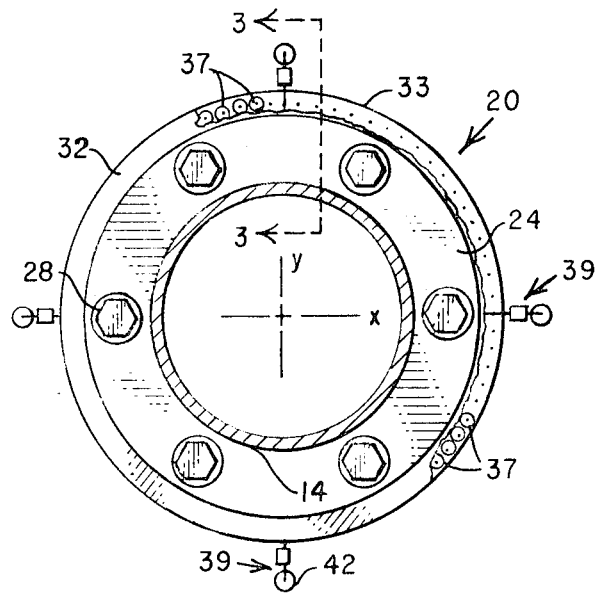
FIG. 2 is a side view with portions partially broken away of the monitor of FIG. 1 taken along lines 2—2.
Figure 3:
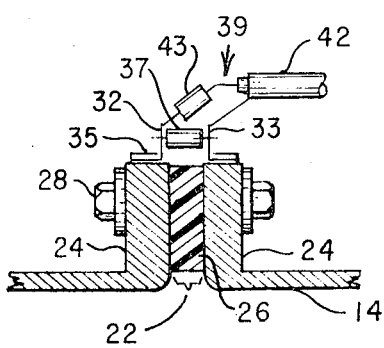
FIG. 3 is a cross-sectional view of a portion of the monitor taken along lines 3—3 of FIG. 2.

To mount the monitor 20 in the pipe 14, the pipe is separated into two sections to provide an electrical gap 22 in the pipe. Each of the opposing section ends across the gap is provided with a flange 24 (FIGS. 2 and 3). The spacing of the gap and the vacuum in the pipe 14 is preserved by means of a ring 26 of electrical insulation material held between opposing faces of the flanges 24 with bolts 28. A pair of conducting rings 32 and 33 are mounted around the periphery of the flanges 24 and held in place and in good electrical contact with the flanges by means of hose clamps 35. A plurality of resistors 37 are connected in parallel between the rings 32 and 33 and are therefore in parallel across the gap 22. The resistors 37 are equally spaced around the periphery of the gap.

In operation, the beam injected by the device 12 into the pipe 14 induces corresponding image currents in the wall of the pipe 14. The currents are parallel to the beam but moving in the opposite direction to the beam. As long as the beam follows a path along the central axis of the beam pipe, the corresponding wall currents are equally distributed around the pipe wall. However, upon deviation of the beam from the central axis, the currents in the side of the wall closest to the beam tend to increase, while the currents in the opposite side tend to decrease. When the beam passes the monitor 20, the corresponding wall currents must pass over the gap between the two sections of pipe 14 by flowing through the resistors 37. When the beam is centered in the pipe, the wall currents are equally distributed and therefore cause equal voltage drops across all of the resistors 37. However, when the beam deviates from the central axis of the pipe, the wall currents are unequally distributed and therefore cause unequal voltage drops across the resistors. The voltage drops are measured across four connections 39 that are made across the gap 22 and spaced at 90 degrees intervals, the diametrically opposed connections defining x-y axes of a coordinate system. The difference between the voltages measured at opposing connections 39 has been found to be substantially proportional to the distance of the beam from the central axis of the pipe along the coordinate axes defined by the connections. The position of the beam with respect to the pipe 14 may be defined, therefore, by the voltage differences measured at the opposing connections. It has also been found that the sum of the voltages at a plurality of connections across the gap 22, such as the four connections 39, is substantially proportional to the intensity of the beam. It has further been found that an indication of the profile of a beam of asymmetric cross section, such as the commonly encountered beam having a "figure eight" cross section, may be determined from the levels of the individual voltages at a plurality of connections across the gap 22, such as the four connections 39; additional connections 39 may be provided for greater accuracy. The individual voltages, the sum of the voltages and the voltage differences may be displayed as an aid in manual regulation of beam profile intensity and beam centering by adjustment of the device 12 and the solenoids 18. Alternatively, the individual voltages and the sum and difference voltages may be applied to feedback circuits for automatic adjustment of the beam forming device 12 and solenoids and steering elements 18. A block 44, representing conventional sum-difference circuits, feedback circuits, sample and hold circuits and display devices, is shown connected between the monitor 20 and the device 12 and the solenoids and steering elements 18. Each connection 39 is comprised of a back-terminating resistor 43, typically 50 ohms, connected in series with a coaxial line 42, typically 50 ohms, leading to the sum and difference and sample and hold circuits in block 44.

Figure 4:
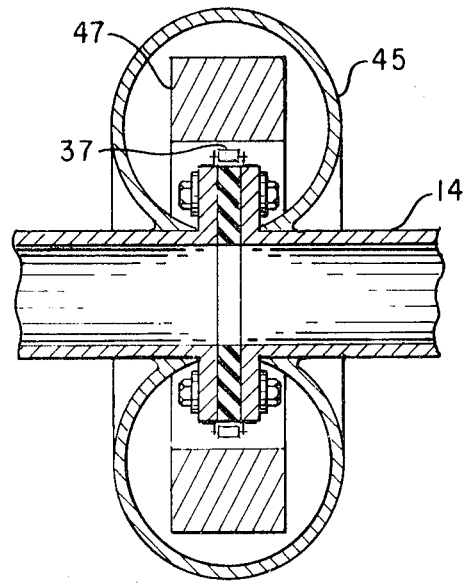
FIG. 4 is a cross-sectional view of a beam monitor of the invention that is provided with a shield for suppressing electromagnetic radiation from the monitor.

In the configuration of FIGS. 2 and 3, there may be radio-frequency radiation from the resistors. Should it be necessary to shield associated equipment from such radiation, an annular shield 45 (FIG. 4) of electrically conductive material may be used to enclose the resistors 37 and thereby shunt the radiation to the beam pipe 14. In order to preserve the voltages develop across the resistors 37 by the wall currents, an inductive path such as inductive core 47 of a material such as ferrite is mounted within the shield. The shield and core constitute a very large inductance to the wall currents and prevent shunting of the wall currents around the resistors.

Figure 5:
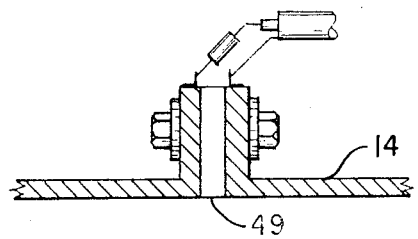
FIG. 5 is a cross-sectional view of an alternative embodiment of the monitor of FIG. 1.

An alternative embodiment of the monitor 20 of FIG. 1 is shown in FIG. 5 in which the resistors 37 have been replaced with a solid annular band 49 of resistive material. With such an arrangement, the total inductance across the gap between the sections of the pipe 14 may be reduced to a very low value to obtain very fast response times for the monitor.

Figure 6:
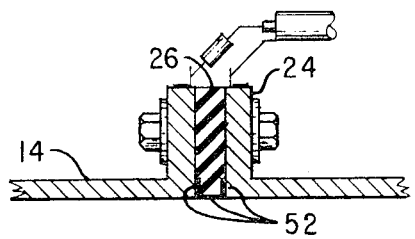
FIG. 6 is a cross-sectional view of another alternative embodiment of the monitor of FIG. 1.

Another alternative embodiment of the monitor 20 of FIG. 1 is shown in FIG. 6 in which the resistors 37 have been replaced with a thin resistive film 52, such as evaporated metal, over the inner surface of the ring 26 of insulation material. The thin film may be made to extend over the inner edges of the ring onto each face for convenient electrical contact with the face of each flange 24. With this arrangement, the inductance across the gap may be made even lower than with the band 49, so as to obtain even faster response times for the monitor 20.

It is noted that in the embodiment of the monitor 20 shown in FIGS. 2 and 3, a large number of resistors are closely and uniformly spaced across the gap and are located away from the inside wall of the pipe. Such an arrangement is advantageous in order to preserve the smooth geometry of the beam pipe, thereby minimizing impedance discontinuities in the pipe and resulting instabilities in the beam 13. In the embodiments shown in FIGS. 5 and 6, the smooth geometry of the beam pipe is preserved by the continuous material of the band or film to an even greater extent to achieve virtual elimination of impedance discontinuities in the beam pipe.

Figure 7:
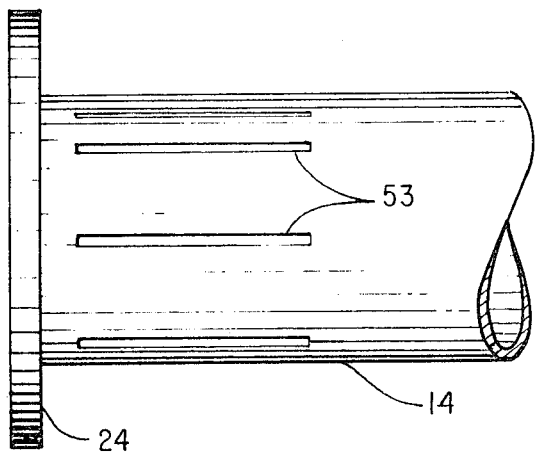
FIG. 7 is a side view of the end of a beam pipe that may be connected to the monitor of the invention and which is provided with longitudinal slots for delaying circumferential dispersion of beam image wall currents.

Due to the resistance across the gap 22, the wall currents near the gap tend to disperse circumferentially in the beam pipe and to equalize. In order to delay equalization of wall currents, longitudinal slots 53 (FIG. 7) may be cut in the pipe 14 to break the circumferential electrical paths for the currents. The slots may be closely and uniformly spaced around the entire circumference of the pipe to preserve the smooth geometry of the pipe and may extend through the pipe flange. Typically, for a beam pipe having an inside diameter of 11.75 inches, the spacing of the slots may be 1 inch for slots that are ⅛ inch wide and 8 inches long. The slots may be filled with a thermosetting plastic electrical insulation to preserve the vacuum within the beam pipe.

An embodiment exemplifying the invention was constructed substantially as shown in FIGS. 2 and 3 and successfully operated as part of an injector that produces a 1,000 A, 4-MeV, pulsed electron beam for an electron ring accelerator. The beam was chopped to provide pulses as short as 5 ns that had rise and fall times of 1 ns. The resistors 37 were 1-watt carbon resistors, each having a resistance of 10 ohms; and there were 100 resistors 37 for a total resistance of 0.1 ohms. With the 1,000 A beam, 100 volt signals were obtained at each of the four connections 39 across the gap 22; and the sum and differences of the signals were taken, as described hereinbefore, to determine intensity and position of the beam.

For a more complete discussion of the development and theoretical aspects of the invention, reference is made to U. S. Atomic Energy Commission technical report No. UCRL-20166, "Nonintercepting Monitor of Beam Current and Position," by Avery, Faltens and Hartwig, Lawrence Radiation Laboratory, University of California, Berkeley, Calif.

While an embodiment of the invention has been shown and described, further embodiments or combinations of those described herein will be apparent to those skilled in the art without departing from the spirit of the invention.

What we claim is:

1. A monitor for detecting the position of a charged-particle beam having a wave front, comprising:
   a beam pipe for receiving said beam for transmission therethrough, said pipe including first and second electrically conductive sections having adjacent ends separated to form a gap, said beam inducing corresponding image currents in the walls of said pipe during traversal therethrough;
   resistive means uniformly spaced around the periphery of said pipe across said gap, said resistive means sustaining virtual normal flow of said image wall currents between said sections, said resistive means being mounted clear of the space enclosed by said pipe; and
   means including a plurality of connections across said resistive means for sensing the voltage drop of said wall currents across said resistive means, the drop across said resistive means at any location around the periphery of said pipe being a function of the distance of the beam from the location at which the drop is measured.

2. The monitor of claim 1 wherein said resistive means includes a plurality of resistors spaced around the periphery of said pipe, each of said resistors having first and second ends connected respectively to said first and second sections.

3. The monitor of claim 1 wherein said resistive means includes a solid band of resistive material extending across said gap at the periphery of said first and second sections.

4. The monitor of claim 1 wherein said resistive means includes a thin resistive film extending across said gap at the periphery of said first and second sections.

5. The monitor of claim 1 wherein said sensing means includes four connections across said resistive means, said connections being spaced apart 90 degrees around the periphery of the pipe, said sensing means further including means for sensing the voltage difference at diametrically opposed sensing connections, the resulting two difference voltages each being proportional to the displacement of the beam from the central axis of the pipe along coordinate axes defined by the diametrically opposed sensing connections.

6. The monitor of claim 1 wherein said sensing means includes a plurality of connections across said resistive means at substantially equally spaced locations, and further including means for adding the voltage drops at said plurality of connections, the sum of said drops being substantially proportional to the intensity of said beam.

7. The monitor of claim 1 wherein said sensing means includes a plurality of connections across said resistive means, and further including means for determining the voltage drop at each of said plurality of connections, the level of each of said voltage drops being indicative of a portion of the profile of an asymmetric beam moving through said pipe.

8. The monitor of claim 1 further including means for suppressing electromagnetic radiation from said resistive means, said suppressing means including an electrically conductive shield external to said pipe and extending from one of said sections to the other across said gap and around said resistive means to enclose said resistive means, and a magnetic path enclosed by said shield to provide an inductive reactance in said shield to said wall currents.

9. The monitor of claim 1 further including:
   first and second electrically conductive flanges connected respectively to opposing ends of said first and second sections;
   a ring of electrical insulation material clamped between said first and second flanges;
   first and second electrically conductive rings mounted respectively around the periphery of said first and second flanges; and
   wherein said resistive means includes a plurality of resistors connected in parallel between said first and second conductive rings and spaced around the periphery of said flanges.

10. The monitor of claim 1 wherein said first and second sections are each provided with a plurality of longitudinal slots near opposing ends of said sections, said slots delaying circumferential dispersion of said wall currents, and further including electrical insulation material filling said slots.

* * * * *